United States Patent
George et al.

(10) Patent No.: US 12,142,742 B2
(45) Date of Patent: Nov. 12, 2024

(54) METHOD OF COOLING BATTERY CELLS

(71) Applicant: McLaren Automotive Limited, Woking (GB)

(72) Inventors: Sunoj Cherian George, Woking (GB); James Douglas McLaggan, Woking (GB); Elie Talj, Woking (GB)

(73) Assignee: McLaren Automotive Limited, Woking (GB)

( * ) Notice: Subject to any disclaimer, the term of this patent is extended or adjusted under 35 U.S.C. 154(b) by 828 days.

(21) Appl. No.: 17/277,255

(22) PCT Filed: Sep. 17, 2019

(86) PCT No.: PCT/GB2019/052605
§ 371 (c)(1),
(2) Date: Mar. 17, 2021

(87) PCT Pub. No.: WO2020/058692
PCT Pub. Date: Mar. 26, 2020

(65) Prior Publication Data
US 2021/0359352 A1  Nov. 18, 2021

(30) Foreign Application Priority Data

Sep. 18, 2018 (GB) .................. 1815189

(51) Int. Cl.
*H01M 10/613* (2014.01)
*H01M 10/625* (2014.01)
(Continued)

(52) U.S. Cl.
CPC ....... *H01M 10/613* (2015.04); *H01M 10/625* (2015.04); *H01M 10/643* (2015.04);
(Continued)

(58) Field of Classification Search
CPC ............. H01M 10/613; H01M 10/625; H01M 10/643; H01M 10/6567; H01M 10/6554;
(Continued)

(56) References Cited

U.S. PATENT DOCUMENTS 8,920,955 B1   12/2014   Chuang et al.
11,374,278 B2 *   6/2022   Ryu .................... H01M 50/519
(Continued)

FOREIGN PATENT DOCUMENTS

EP    2107632 A1 * 10/2009   .......... H01M 10/613
EP    3166175 A1 *  5/2017   ............ H01M 10/48
(Continued)

OTHER PUBLICATIONS

GB Search Report issued in GB Application No. GB1815189.4, date of search Feb. 19, 2019. 4 pages.
(Continued)

*Primary Examiner* — Kun Kai Ma
(74) *Attorney, Agent, or Firm* — Mintz Levin Cohn Ferris Glovsky and Popeo, P.C.

(57) ABSTRACT

A method of cooling an array of battery cells within a chamber in a housing, the battery cells being electrically connected via a busbar having at least one terminal tab for connection to an electrical terminal in the housing, the method comprising the steps of: supplying coolant through an opening in the housing into the chamber; and diverting at least a part of the coolant flow from its inlet flow path due to impingement of the flow upon part of the terminal tab.

20 Claims, 7 Drawing Sheets

(51) Int. Cl.
| | |
|---|---|
| *H01M 10/643* | (2014.01) |
| *H01M 10/6553* | (2014.01) |
| *H01M 10/6567* | (2014.01) |
| *H01M 50/213* | (2021.01) |
| *H01M 50/262* | (2021.01) |
| *H01M 50/264* | (2021.01) |
| *H01M 50/284* | (2021.01) |
| *H01M 50/296* | (2021.01) |
| *H01M 50/505* | (2021.01) |
| *H01M 50/522* | (2021.01) |
| *H01M 50/569* | (2021.01) |

(52) U.S. Cl.
CPC ... *H01M 10/6553* (2015.04); *H01M 10/6567* (2015.04); *H01M 50/213* (2021.01); *H01M 50/296* (2021.01); *H01M 50/505* (2021.01); *H01M 50/522* (2021.01); *H01M 50/262* (2021.01); *H01M 50/264* (2021.01); *H01M 50/284* (2021.01); *H01M 50/569* (2021.01); *H01M 2220/20* (2013.01)

(58) Field of Classification Search
CPC .............. H01M 50/296; H01M 50/505; H01M 50/264; H01M 2220/20; H01M 6/5038
See application file for complete search history.

(56) References Cited

U.S. PATENT DOCUMENTS

| | | | | |
|---|---|---|---|---|
| 2005/0260479 | A1* | 11/2005 | Raiser | H01M 8/2484 |
| | | | | 429/457 |
| 2009/0297892 | A1 | 12/2009 | Ijaz et al. | |
| 2012/0094157 | A1* | 4/2012 | Seto | H01M 50/213 |
| | | | | 429/82 |
| 2014/0087220 | A1* | 3/2014 | Seiler-Thull | H01M 50/503 |
| | | | | 429/83 |
| 2015/0188203 | A1* | 7/2015 | Enomoto | H01M 50/24 |
| | | | | 429/83 |
| 2015/0194712 | A1* | 7/2015 | He | H01M 10/6551 |
| | | | | 429/82 |
| 2015/0223366 | A1* | 8/2015 | Horiuchi | H05K 7/20254 |
| | | | | 361/689 |
| 2015/0255225 | A1 | 9/2015 | Kusaba et al. | |
| 2017/0229208 | A1 | 8/2017 | Kovent | |
| 2017/0288286 | A1* | 10/2017 | Buckhout | H01M 50/519 |
| 2018/0034021 | A1 | 2/2018 | Yamamoto et al. | |

FOREIGN PATENT DOCUMENTS

| | | | | | |
|---|---|---|---|---|---|
| EP | 3547398 | A1 * | 10/2019 | | B60K 1/04 |
| EP | 3828985 | A2 * | 6/2021 | | H01M 10/425 |
| JP | 2009059474 | A * | 3/2009 | | H01M 10/613 |
| JP | 2015138620 | A | 7/2015 | | |
| JP | 2016091959 | A | 5/2016 | | |
| JP | 2016157623 | A * | 9/2016 | | |
| JP | 2018018754 | A | 2/2018 | | |
| WO | WO-2010125977 | A1 * | 11/2010 | | B60L 11/1874 |
| WO | WO-2015075460 | A1 * | 5/2015 | | H01M 2/10 |
| WO | WO-2020/058692 | A1 | 3/2020 | | |
| WO | WO-2020058690 | A1 * | 3/2020 | | H01M 50/20 |
| WO | WO-2020058693 | A1 * | 3/2020 | | H01M 10/425 |
| WO | WO-2021214794 | A1 * | 10/2021 | | H01M 10/6568 |

OTHER PUBLICATIONS

International Search Report and Written Opinion issued in International Application No. PCT/GB2019/052605, mailed Dec. 12, 2019 (Dec. 12, 2019). 13 pages.

* cited by examiner

METHOD OF COOLING BATTERY CELLS

This invention relates to a method of cooling battery cells and a battery in which the battery cells are cooled.

Electric powered or hybrid vehicles are well known and are becoming more and more prevalent as the desire to reduce carbon emissions increases. In such vehicles, the power that can be provided by, and the weight of, the battery is vital in determining the performance of the vehicle. The power to weight ratio of the battery is therefore something that vehicle designers are trying to optimise. This can clearly be done either by increasing the power generated for a given weight or by reducing the weight for a given power output, or most likely a combination of the two.

The batteries in electric or hybrid vehicles are typically made up of a plurality of individual battery cells connected together in such a way to allow large amounts of power to be provided to drive the wheels or power other systems in the vehicle. These cells are typically provided in the form of one or more battery modules which can be electrically connected.

Battery cells have optimum operating conditions and, in particular, operating temperatures. If the battery cells are outside of these optimum conditions, then the performance of the cells can deteriorate and the power the cells can provide is reduced. Alternatively or additionally, overheating can affect the operating life and/or general reliability of the battery cells, which is also undesirable.

It is known to provide cell trays having a plurality of holes or recesses for holding battery cells. Such cell trays allow coolant fluid to circulate around parts of the battery cells, thereby providing a cooling effect to the cells as heat is transferred from the cells to the coolant. It is known to use a pair of cell trays, one supporting each end of the battery cells, with the coolant fluid being permitted to flow over the central portion of each cell, but having the cell terminals of the cells, typically located at each end of the cell, covered.

The cell tray or trays are typically located within a housing into which the coolant fluid is supplied for circulation. Obtaining and maintaining sufficient circulation of the coolant fluid within the housing around the battery cells is important, as dead spots can easily form within the housing in which circulation of the coolant is poor or non-existent. Such dead spots lead to localise overheating, and therefore reduced performance or increased likelihood of failure, of the battery cells or other components which are close by.

According to the present invention there is provided a method of cooling an array of battery cells within a chamber in a housing, the battery cells being electrically connected via a busbar having a terminal tab for connection to an electrical terminal in the housing, the method comprising the steps of: supplying coolant through an opening in the housing into the chamber; and diverting at least a part of the coolant flow from its inlet flow path due to impingement of the flow upon part of the terminal tab.

Such a method is beneficial as an existing battery component can be utilised to direct the coolant flow to one or more regions of the housing which might otherwise suffer from reduced coolant flow. This not only minimises localised regions of overheating thereby maximising the cooling effect provided and allowing the battery cells to operate within the optimum temperature range, but also achieves this whilst not requiring additional parts, thereby minimising material usage and therefore reducing the weight of the battery module.

The invention also provides a battery comprising a housing defining a chamber in which an array of battery cells are provided, the housing having an electrical terminal, an opening through the housing into the chamber through which, in use, coolant can be supplied, a busbar electrically connecting the array of battery cells and having a terminal tab for connection to the electrical terminal, wherein the terminal tab is positioned such that, in use, at least a part of the coolant flow impinges upon part of the terminal tab.

The inlet flow typically has a flow axis. A body portion of the tab may be angled relative to the flow axis by between 60 and 85 degrees.

The inlet flow is preferably diverted, at least in part, away from the flow axis towards a distal corner. The distal corner is typically the corner furthest from the opening. The distal corner may be a lower corner.

The method may also comprise the step of diverting coolant from a first side of a cell tray to a second side of a cell tray. The coolant flow may be caused to pass through openings in a distal end of the cell tray.

The busbar may have a plurality of terminal tabs. Two tabs may be provided on the inlet side. Those two tabs may correspond to respective positive and negative terminals.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Battery Overview

Figure 1:
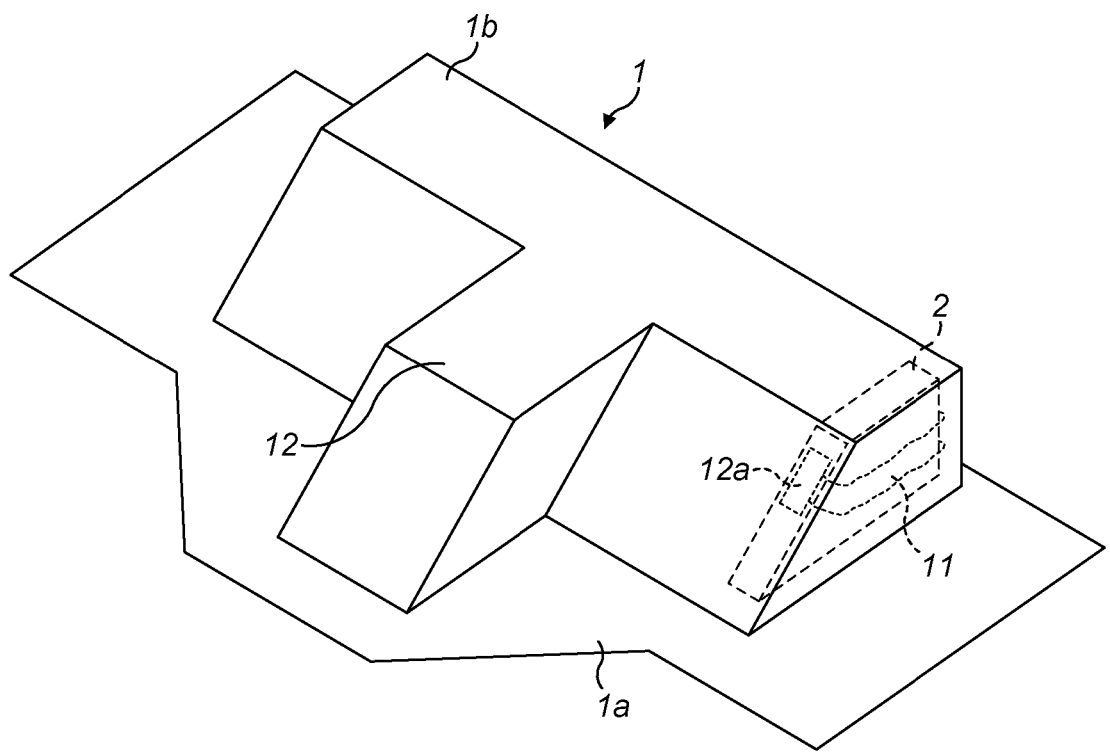
FIG. 1 shows a battery.

FIG. 1 shows a battery 1 which may comprise a number of identical battery modules 2. The battery modules may be arranged in a row. The battery may comprise any number of battery modules 2. In the example depicted in FIG. 1, one battery module 2 is shown for clarity, but in a preferred example there may be thirteen modules.

The battery may be installed in a vehicle. FIG. 1 shows the battery 1 fixed to a battery floor 1*a*. The battery floor 1*a* may be structurally integral to the vehicle in which the battery is installed. For example, the battery floor may be a load bearing component of a vehicle chassis. The battery floor 1a may be configured to be removably fitted to the vehicle so that the battery 1 can be removed from the vehicle. For example, for maintenance or replacement of the battery 1.

The battery 1 may further comprise a battery control unit 12 which protrudes from the row of battery modules. The battery control unit 12 may be electrically connected to one or more module control units 12a. Each battery module 2 may comprise an attached module control unit 12a. The battery control unit 12 may control each battery module control unit 12a. Each battery module control unit 12a may control the activity of the respective attached battery module. Each battery module control unit 12a may receive information concerning the operation of the respective attached battery module. The battery module control units 12a may process that information and feed that information to battery control unit 12.

The battery modules and battery control unit 12 may be enclosed by the battery floor 1a and a battery housing 1b.

Figure 2:
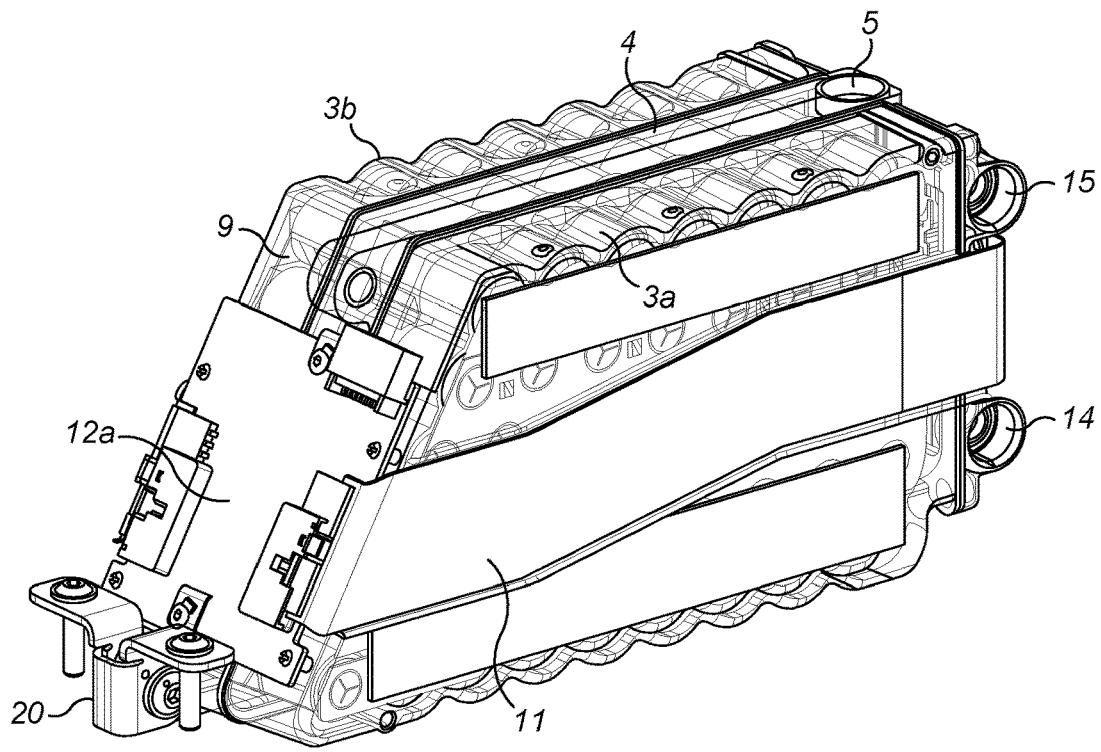
FIG. 2 shows a battery module from the front.

FIG. 2 shows a battery module 2 with a trapezoidal prism shape. The battery module depicted in FIG. 2 comprises a cell tray 4 and a two-part housing 3a, 3b. In FIG. 2, the battery module 2 and the cell tray 4 share a common longitudinal axis.

Cell Tray

Figure 4:
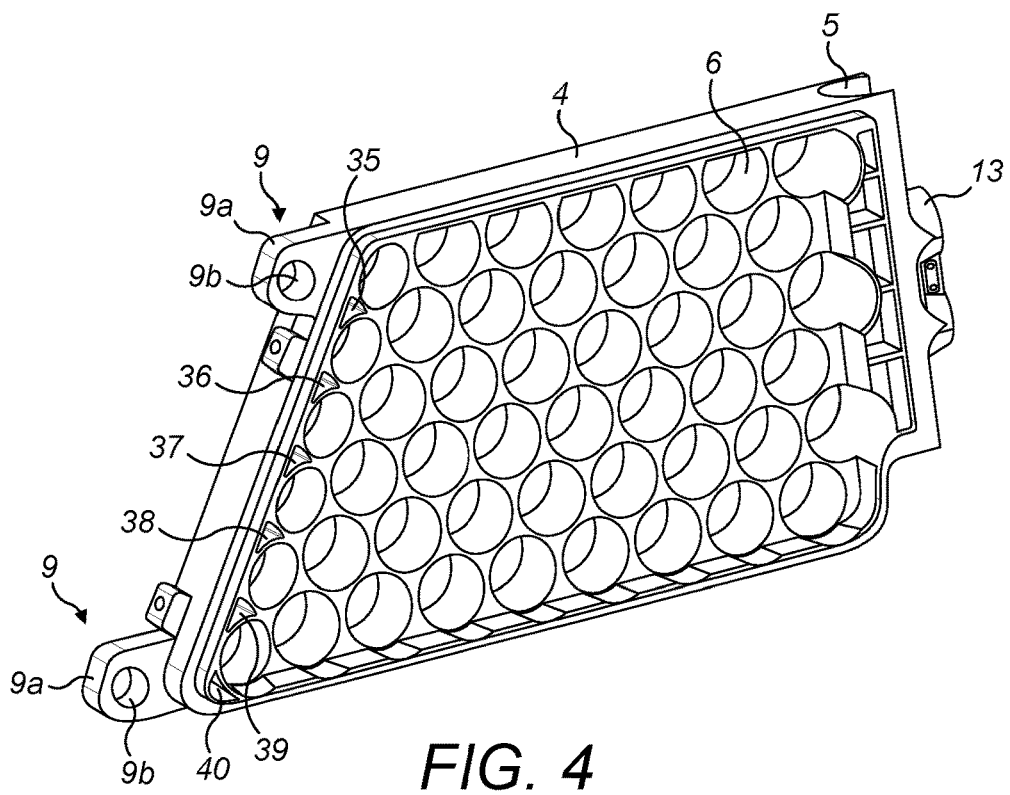
FIG. 4 shows a cell tray.

An exemplary cell tray 4 is shown in FIG. 4. The cell tray depicted in FIG. 4 comprises cell holes 6 for holding cells (not shown). Each cell hole 6 may extend through the cell tray in a direction perpendicular to the longitudinal axis of the cell tray. The cell tray may be formed of electrically insulating material.

The cell tray may further comprise a fixing hole 5 configured to receive a fixing element (not shown) for securing the cell tray 4, and hence the battery module 2, to the battery floor (not shown).

FIG. 4 shows the cell tray 4 comprising two fixings 9, each fixing comprising a tab 9a, the tab forming a connection hole 9b. Both fixings are generally positioned in the same plane as the cell tray. Each connection hole 9b may extend through its respective tab 9a in a direction parallel to the direction in which the cell holes 6 extend through the cell tray 4. The cell tray may comprise more than two fixings. The cell tray may comprise a single fixing. Fixings on multiple battery modules may receive one or more common elements so that the battery modules can be secured to one another.

Figure 5:
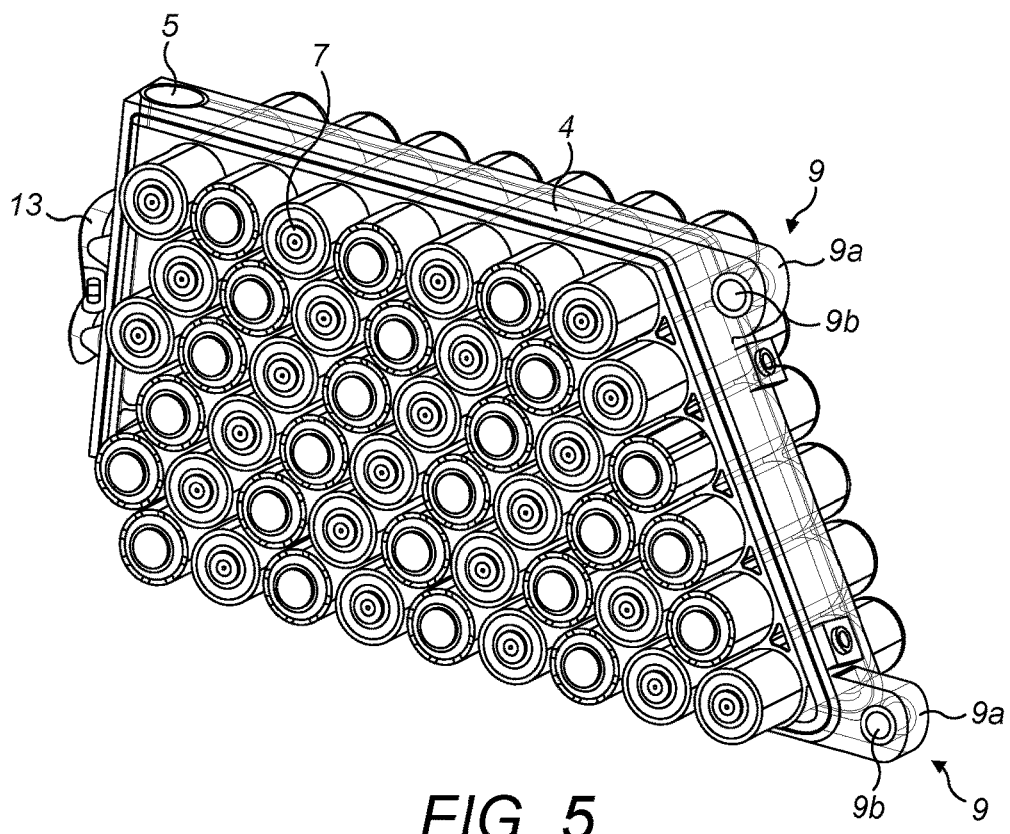
FIG. 5 shows a cell tray holding cells.

FIG. 5 shows a number of cells 7 being held in the cell holes 6 of the cell tray 4. The cell tray may be configured to hold any number of cells. In the example depicted in FIG. 5 there are forty-eight cells held in respective cell holes 6. Each cell hole may hold one cell.

Resin may be poured into a recessed side of the cell tray. The resin may harden around cells placed in the cell tray so as to secure the cells in the cell tray. Alternatively, each cell 7 may be held in a cell hole 6 by an interference fit between the cell tray 4 surrounding the cell hole and the cell inserted into the respective cell hole.

Each cell hole may extend through the cell tray in a direction perpendicular to the longitudinal axis of the cell tray. In the example cell tray depicted in FIGS. 4 and 5, each cell hole is cylindrical so as to accommodate cylindrical cells. In other examples, each cell hole may be prismatic so as to accommodate prismatic cells.

The length of each cell may be greater than the length of each cell hole. Each cell 7 comprises a positive terminal and negative terminal. When a cell 7 is inserted into a cell hole 6, a length of the cell 7 comprising the positive terminal of the cell may protrude from the cell hole on one side of the cell tray 4 whilst a length of the cell 7 comprising the negative terminal protrudes from the cell hole on the other side of the cell tray. The portion of the cell 7 comprising the positive terminal and the portion of the cell 7 comprising the negative terminal may protrude from opposite sides of the cell tray. The protruding length of the portion of the cell comprising the cell's positive terminal and the protruding length of the portion of the cell comprising the cell's negative terminal may be equal.

Figure 3:
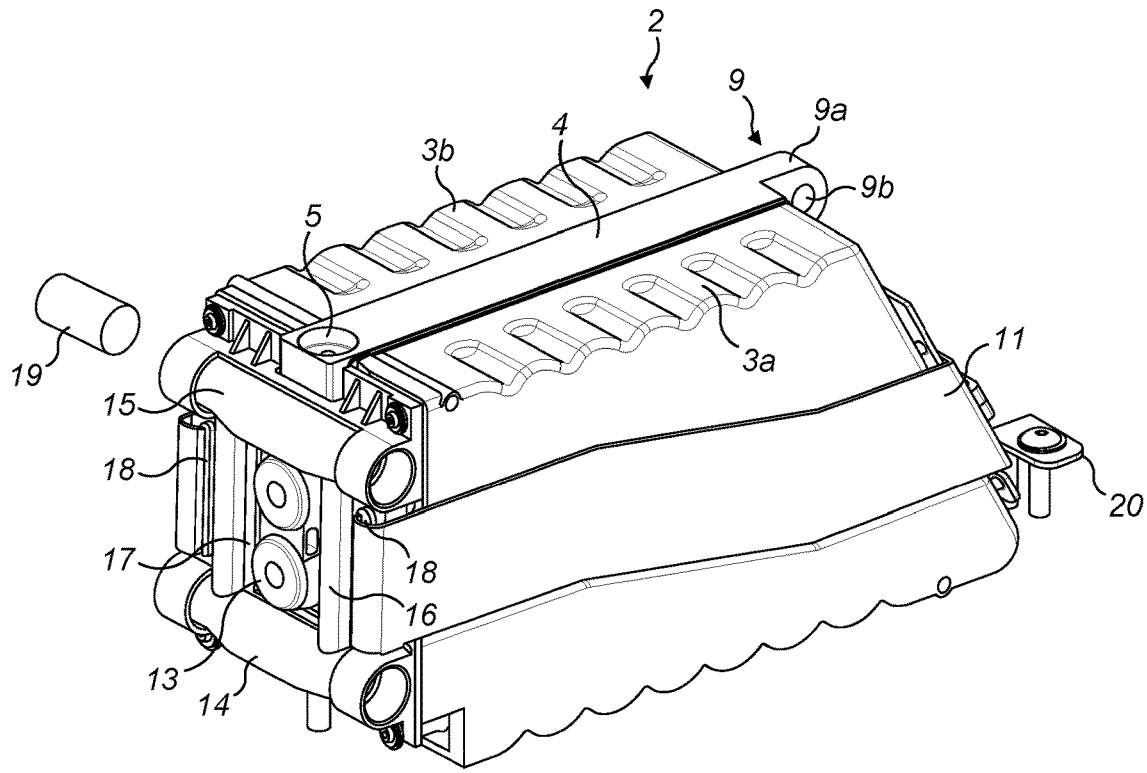
FIG. 3 shows a battery module from the back.

The battery module 2 shown in FIG. 2 comprises a two-part module housing 3a, 3b. The housing 3a, 3b may form two enclosed regions which contain the cells 7 held in the cell tray 4. In FIG. 2, one part of the module housing 3a encloses the portions of cells protruding on one side of the cell tray. The second part of the module housing 3b encloses the portions of the cells protruding on the opposite side of the cell tray. In FIGS. 2 and 3, the exterior faces of the battery module 2 comprise faces of the cell tray 4 and the housing 3a, 3b. Alternatively, the housing 3a, 3b may enclose the entirety of the cell tray. In this case, the exterior faces of the battery module would comprise faces of the housing 3a, 3b.

Cell to Cell Busbars and Flexible Printed Circuit Board

Figure 7:
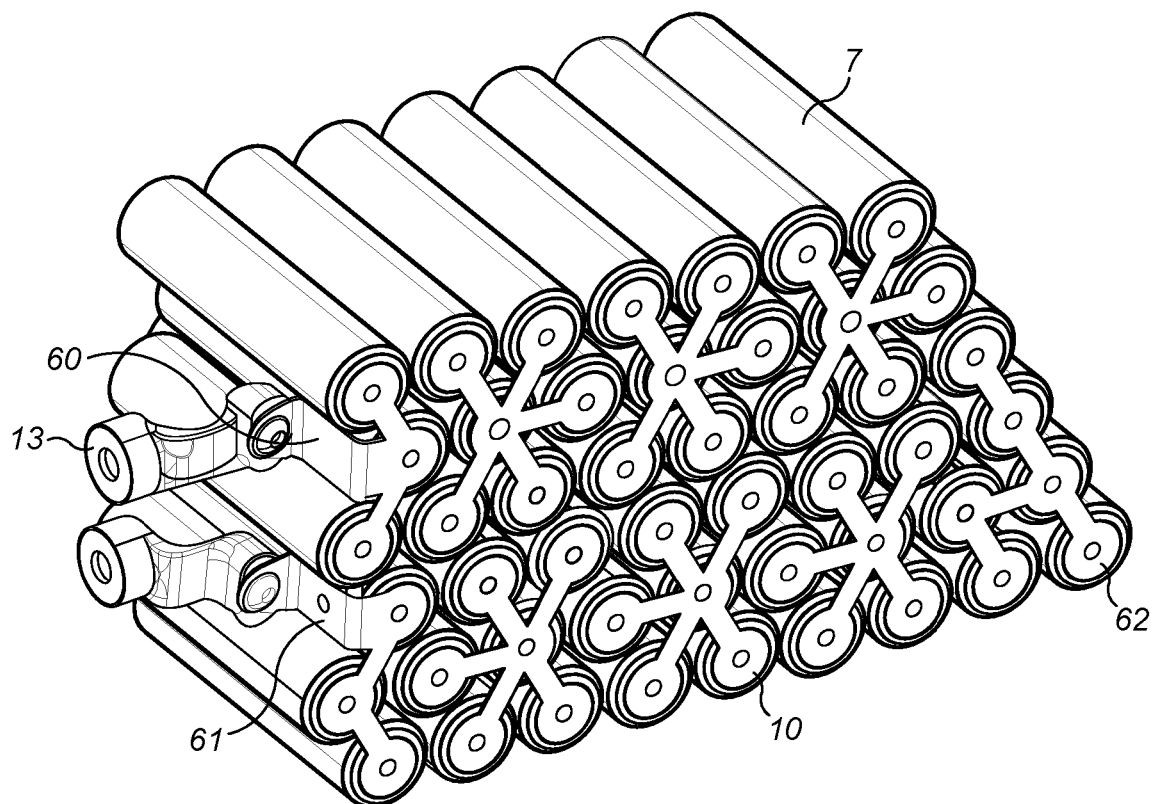
FIG. 7 shows the cells, busbars and module terminals of a battery module.

FIG. 7 shows busbars 10 contacting the terminals of multiple cells to form electrical connections between the multiple cells 7. The busbars 10 are formed of electrically conductive material. The busbars 10 may be formed of metal, for example copper or aluminium.

As above, the cell tray 4 (not shown in FIG. 7) fixedly holds cells 7, each cell having a positive terminal and a negative terminal. The busbars 10 may link the cell terminals of any number of cells.

Cells 7 may be arranged in the cell tray 4 so that positive and negative cell terminals protrude from opposite sides of the cell tray. In this way, a current flow path may be created through cells and busbars. For example, the current flow path may "snake" through the battery module. The current flow path may repeatedly intersect the cell tray. The current flow path may repeatedly intersect the longitudinal axis of the battery module. At least some of the cells may be connected in parallel by the busbars 10, meaning that the current flow path passes through multiple cells as the current flow path intersects the cell tray.

Module terminals 13 are shown in FIG. 7. The module terminals 13 are positioned on the back of the battery module and may be integral to the cell tray 4 (not shown in FIG. 7). Module terminals 13 of neighbouring battery modules may be electrically connected, for example, by module to module busbars. The module terminals 13 allow a supply of current to and/or from the cells 7 of the battery module 2.

Figure 6:
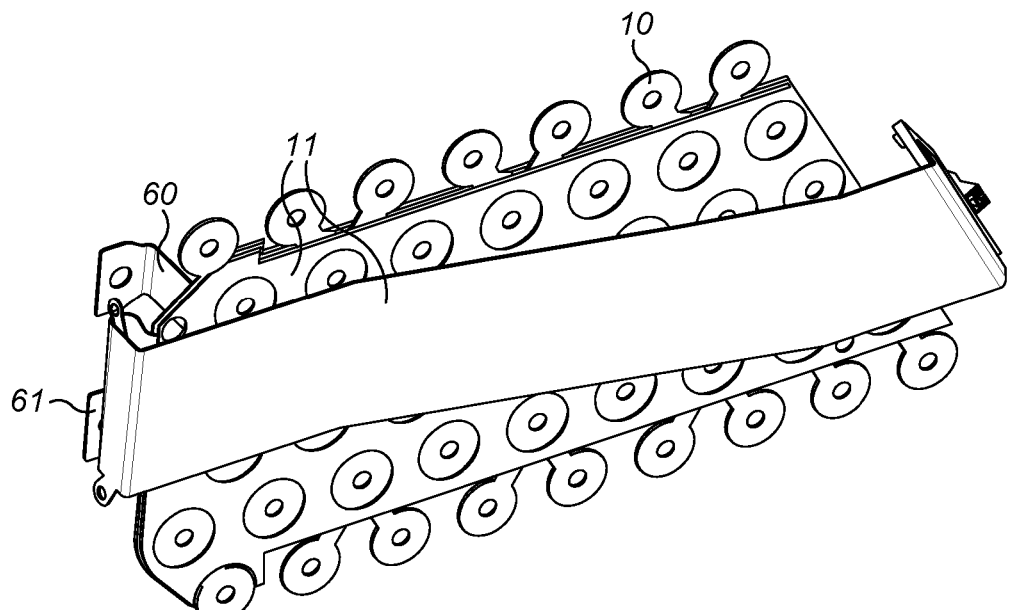
FIG. 6 shows the busbars and flexible printed circuit of a battery module.

The busbars 10 may be integrated with a flexible printed circuit board (not shown in FIG. 7). FIG. 6 shows the flexible printed circuit board 11 of a battery module. A portion of the flexible printed circuit board 11 is located in the region enclosed by the module housing and another portion of the flexible printed circuit board 11 is wrapped around the exterior faces of both parts of the two-part module housing 3a, 3b, also shown in FIGS. 2 and 3.

The busbars 10 shown in FIGS. 6 and 7 may be integrated with the flexible printed circuit board 11. The busbars 10 may be configured to conduct a high level of current between the cells of the module and the module terminals 13.

The flexible printed circuit board 11 shown in FIG. 6 may further comprise sense wires. The sense wires may be configured to conduct a low current signal. The sense wires in the flexible printed circuit board may be attached to voltage sensors. Each voltage sensor may be capable of determining the voltage at a point on the busbar. Each voltage sensor may be capable of determining the voltage being drawn from a cell. Each voltage sensor may be capable of inferring the voltage being drawn from a cell from a measurement taken of the voltage being drawn from a busbar 10. Each sense wire in the flexible printed circuit board may be capable of communicating voltage measurements from a voltage sensor to a module control unit 12*a*, shown in FIG. 1. The module control unit 12*a* may be capable of adapting the activity of the battery module in response to the voltage measurements provided by the sense wire. Each sense wire may be capable of communicating voltage measurements to the battery control unit. The module control unit 12*a* may be capable of communicating voltage measurements to the battery control unit. The battery control unit 12, also shown in FIG. 1, may be capable of adapting the activity of the battery module in response to the voltage measurements. The battery control unit 12 may be capable of adapting the activity of the battery in response to the voltage measurements.

The sense wires of the flexible printed circuit board 11 may be attached to one or more temperature sensors. A temperature sensor may be capable of determining the temperature of a part of the battery module. Each sense wire may be capable of communicating temperature measurements from a temperature sensor to the module control unit. The module control unit may be capable of adapting the activity of the battery module in response to the temperature measurements provided by the sense wire. Each sense wire may be capable of communicating temperature measurements to the battery control unit. The module control unit may be capable of communicating temperature measurements to the battery control unit. The battery control unit may be capable of adapting the activity of the battery module in response to the temperature measurements. The battery control unit may be capable of adapting the activity of the battery in response to the temperature measurements.

The sense wires may be attached to other types of sensors, for example current sensors, and/or fluid flow sensors.

FIGS. 6 and 7 also show terminal tabs 60, 61 which each of which connect either a positive or a negative end of the busbar to the respective positive or negative module terminal.

Module Cooling

It is known to supply coolant to regulate the temperature of batteries. In typical batteries, the coolant is confined within coolant jackets or pipes. In such batteries, cells are cooled in areas of the cell which make contact with the jacket or pipe containing the coolant. This is a slow and inefficient cooling method.

In other typical batteries, coolant is not confined by coolant jackets or pipes, but makes direct contact only with the body/centre portion of each cell. In such batteries, the cell terminals are protected so that coolant does not make contact with the cell terminals. Such contact is avoided as it would typically lead to electrical shorting. This is also an inefficient method because the cell terminals, being electrically connected, are often the hottest parts of the cell and yet they are not directly cooled by the coolant.

By contrast, in the battery module described herein, coolant supplied to the battery module 2 makes direct contact with cell terminals, flexible printed circuit board 11, busbars 10, and cell body. The entirety of the cell and connected conducting parts are bathed in coolant. The coolant used is a dielectric oil. Dielectric oils have insulating properties. Cells drenched in dielectric oil are insulated from one another preventing short circuiting between cells. This is an efficient method of regulating cell temperature. Such efficient cooling enables the cells to operate at a higher power and for longer. This means that fewer and/or smaller cells are required to generate the same power as batteries utilising the previously mentioned cooling methods.

FIG. 3 shows a supply coolant conduit portion 14 and a drain coolant conduit portion 15. In the exemplary configuration shown in FIG. 3, the supply coolant conduit portion 14 is positioned in a lower position and the drain coolant conduit portion 15 is positioned in an upper position. Such a configuration reduces the risk of air locks occurring during filling. Alternatively, the supply coolant conduit portion may be positioned in an upper position and the drain coolant conduit portion may be positioned in a lower position.

Both coolant conduit portions may extend along the battery module in a direction orthogonal to the longitudinal axis of the battery module. Both coolant conduit portions may extend along the battery module in a direction orthogonal to the direction in which the fixing hole 5 extends through the cell tray 4. Both coolant conduit portions may extend along the battery module in a direction parallel to the direction in which the cell holes 6 extend through the cell tray 4.

As shown in FIG. 3, the supply coolant conduit portion 14 is linked to an inlet 16 in the battery module so that coolant may be supplied to a region enclosed by the housing of the battery module. The drain coolant conduit portion 15 is linked to an outlet 17 so that coolant may be drained from a region enclosed by the housing of the battery module. Inlet 16 and outlet 17 are openings formed in the module housing. The coolant may be supplied to one of the two regions enclosed by the housing and be drained from the other of the two regions enclosed by the housing, one region being on an opposite side of the longitudinal axis of the cell tray to the other region. The cell tray 4 may comprise through-holes 35 to 40 for allowing the passing of coolant from a respective one of the said regions to the other of the said regions. The through-holes may be located in the cell tray 4 at the end of the cell tray 4 remote from the inlet 16 and outlet 17. The through-holes may be shaped to promote even fluid flow over the cells.

As shown in FIG. 1, battery 1 contains a number of battery modules 2 arranged in a row. When battery modules 2 are positioned in a row, a coolant conduit portion 14 of one battery module aligns with a coolant conduit portion of a neighbouring battery module. The two coolant conduit portions may be connected to one another by a coupler 19, shown in FIG. 3. Couplers 19 form liquid tight connections between coolant conduit portions so that coolant may flow from portion to portion. When supply coolant conduit portions 14 of the battery modules in the row of battery modules are connected by couplers 19, they form a supply coolant conduit 14*a* which extends along the length of the row of battery modules. When drain coolant conduit portions 14 of the battery modules in the row of battery modules are connected by couplers 19, they form a drain coolant conduit 15*a* which extends along the length of the row of battery modules.

As shown in FIG. 1, the longitudinal axes of all the battery modules 2 in the row of battery modules of the battery 1, may be parallel to one another. Both coolant conduits 14*a*, 15*a* may extend along the row of battery modules in a direction orthogonal to the longitudinal axes of the battery modules in the row of battery modules. Both coolant conduits may extend along the row of battery modules in a direction orthogonal to the direction in which the fixing hole 5 extends through the cell tray 4 of each battery module. Both coolant conduits may extend along the row of battery modules in a direction parallel to the direction in which the cell holes 6 extend through the cell tray 4 of each battery module.

Inlet 16 and outlet 17 may be configured to allow coolant to enter and leave the battery module 2. Inlet 16 and outlet 17 may further act as passages through which the flexible printed circuit boards 11 pass between the interior and exterior of the battery module, as shown in FIG. 3. The inlet 16 and outlet 17 may be the only openings in the two-part housing 3a, 3b of the battery module 2. FIG. 3 shows sealant 18 around the inlet 16 and outlet 17. Sealant 18 ensures that coolant inside the battery module does not leak from the battery module into other parts of the battery.

The method of direct cell cooling described herein also has further advantages in the case that excessive pressure builds up inside a cell. Each cell may comprise a cell vent port. In the case that excessive pressure builds up inside the cell, the cell vent port may be activated, allowing fluids within the cell to escape the cell. The cell vent port may be configured to expel cell fluids in the event that pressure within the cell exceeds a threshold. Upon leaving the cell, the fluids are quenched by the surrounding coolant.

Coolant Flow

FIGS. 6 and 7 further show terminal tabs 60, 61 which each of which connect either a positive or a negative end of the busbar to the respective positive or negative module terminal. As will be understood from FIG. 3, the module terminals are located at the end of the battery module at which the coolant flow enters and leaves the battery module. Given the space constraints, it is inevitable that one or both of the terminal tab 60, 61 extend across at least part of the opening(s) through which coolant enters the battery module. It is of course possible to minimise the size of the terminal tabs 60, 61, such that the effect of the tab within the inlet flow is minimised, but this would affect the ability of the busbar to carry the necessary current. However, any overlap between the inlet flow and the terminal tabs can affect the flow through the module.

It has been recognised however that, rather than simply try to reduce the size and effect of the terminal tabs, the tabs could be used to direct the inlet coolant flow to desired locations within the battery module by purposely allowing the inlet coolant flow to impinge upon the tab. By impinging on the tab, we mean that the direction of some or all of the inlet coolant flow is changed from that which would occur without the tab being present. The distal most corner or corners of the module, in this case lower corner 62, can suffer from the lowest flow of coolant. This region therefore suffers from potential overheating of one or more of the cells. One or more of the terminal tabs are therefore positioned such that the inlet coolant flow is directed towards a region of lower flow rate and therefore reduced cooling, in this case towards the lower distal corner. The terminal tabs, and therefore both of the connections from the busbars to the terminals, are present only on the inlet side of the battery module in this example and therefore the outlet flow stream is free of the obstructions. One of the connections could in practice be located on the outlet side, but this would reduce the ability to use the terminal tabs for flow guidance.

Each tab may divert the flow to substantially the same region of the module, or each tab may divert the flow to different regions. For example, one tab could direct coolant towards an upper distal corner and another tab to a lower distal corner. This arrangement may be used in conjunction with two inlet coolant paths, say an upper and a lower coolant path, when one tab directs one of the inlet flow paths and the other tab directs the other inlet flow paths.

The tray 4 may also comprise coolant flow holes 35 to 40, as shown in FIG. 4. These coolant flow holes extend through the cell tray from one side to the other and are located at the opposite end of the cell tray to the inlet and outlet coolant flow. The coolant flow holes permit coolant to pass from one side to the other of the tray. In this way, inlet coolant passes along one side of the tray, through the coolant flow holes, and outlet coolant then flows along the other side of the tray in substantially the opposite direction to the inlet coolant. It may be possible to replace the plurality of openings with a single opening which extends over a significant portion, at least 50% and preferably 75% or more, of the height of the cell tray, and in which the cross section of the opening increases in size towards the bottom of the opening.

Figure 8:
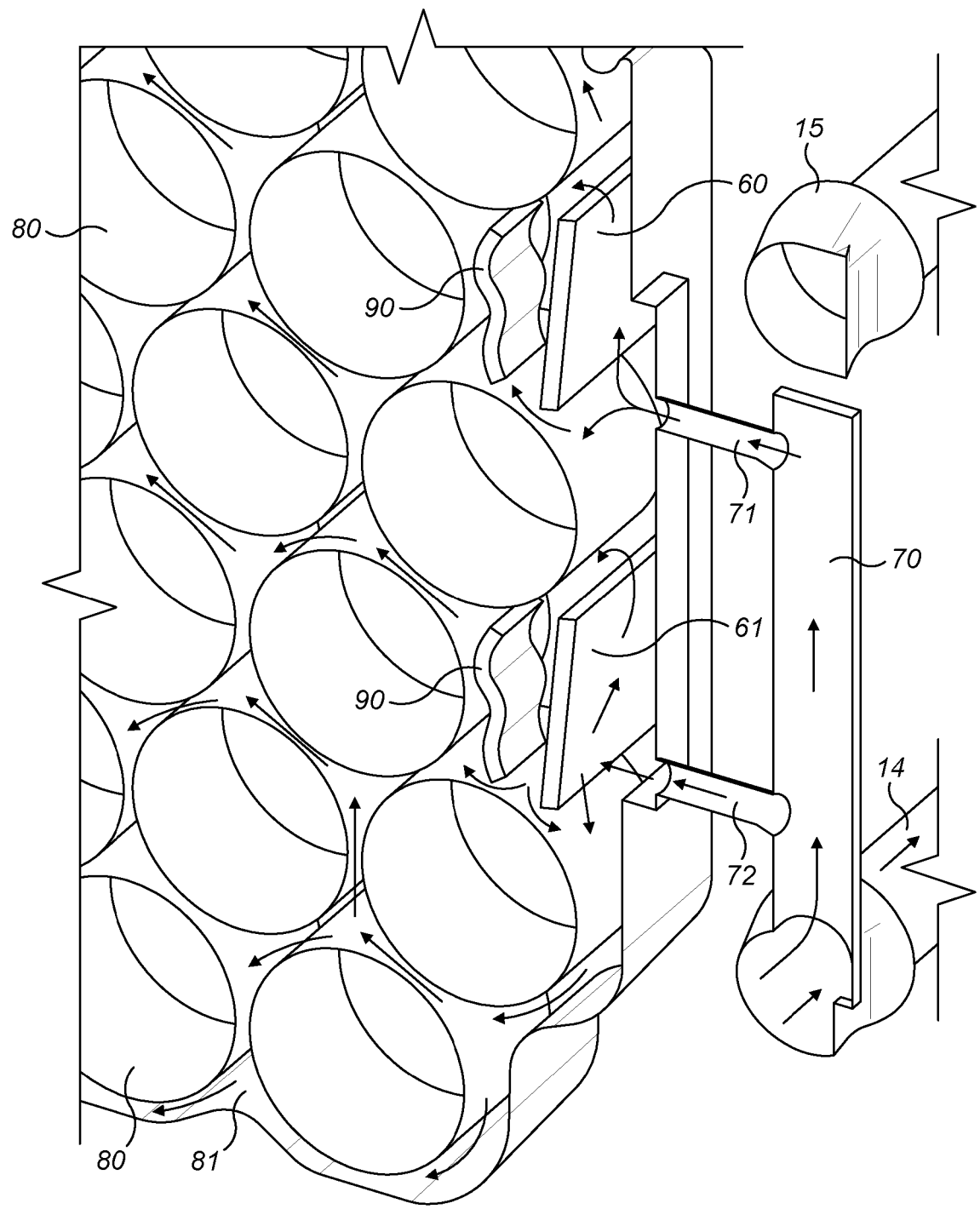
FIG. 8 shows inlet flow deflecting surfaces on an inlet side of the module.
Figure 9:
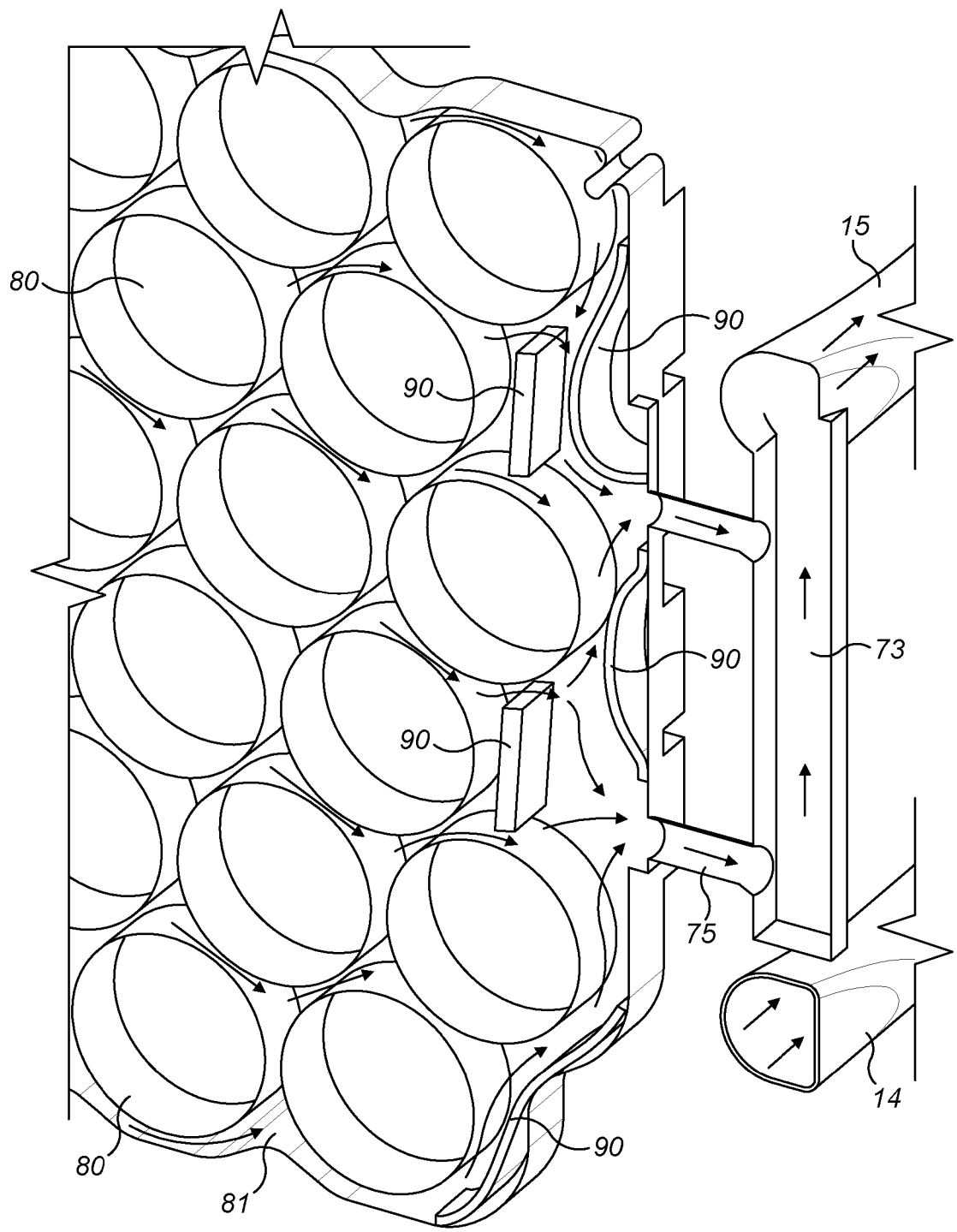
FIG. 9 shows outlet flow deflecting surfaces on an outlet side of the module.

FIGS. 8 and 9 show partial views of the region in which coolant flows—the figures are in effect longitudinal slices through the battery module, parallel to the cell tray and through the battery cells. The battery cells and the housing are not shown and therefore the holes 80 indicate where the cells would be and therefore the surrounding space 81 is the space in the chamber in which the coolant flows. Thus, the holes 80 are not spaces into which fluid could flow, as each hole is only defined by the presence of a battery cell. There is no structure other than the cell which forms or defines the holes 80. The outer limit of space 81 is the inner surface of the respective housing part. FIG. 8 shows the inlet side of the module with the cell tray being located in front of the page and the end of the cells, the busbars and the outer wall of the housing being located and FIG. 9 shows the outlet side and each Figure shows the supply conduit 14 and the drain conduit 15. The different "depths" of FIGS. 8 and 9 are due to the locations of the inlet 16 and the outlet 17 being closer to the cell tray 4 than the respective side walls of the module.

Figure 10:
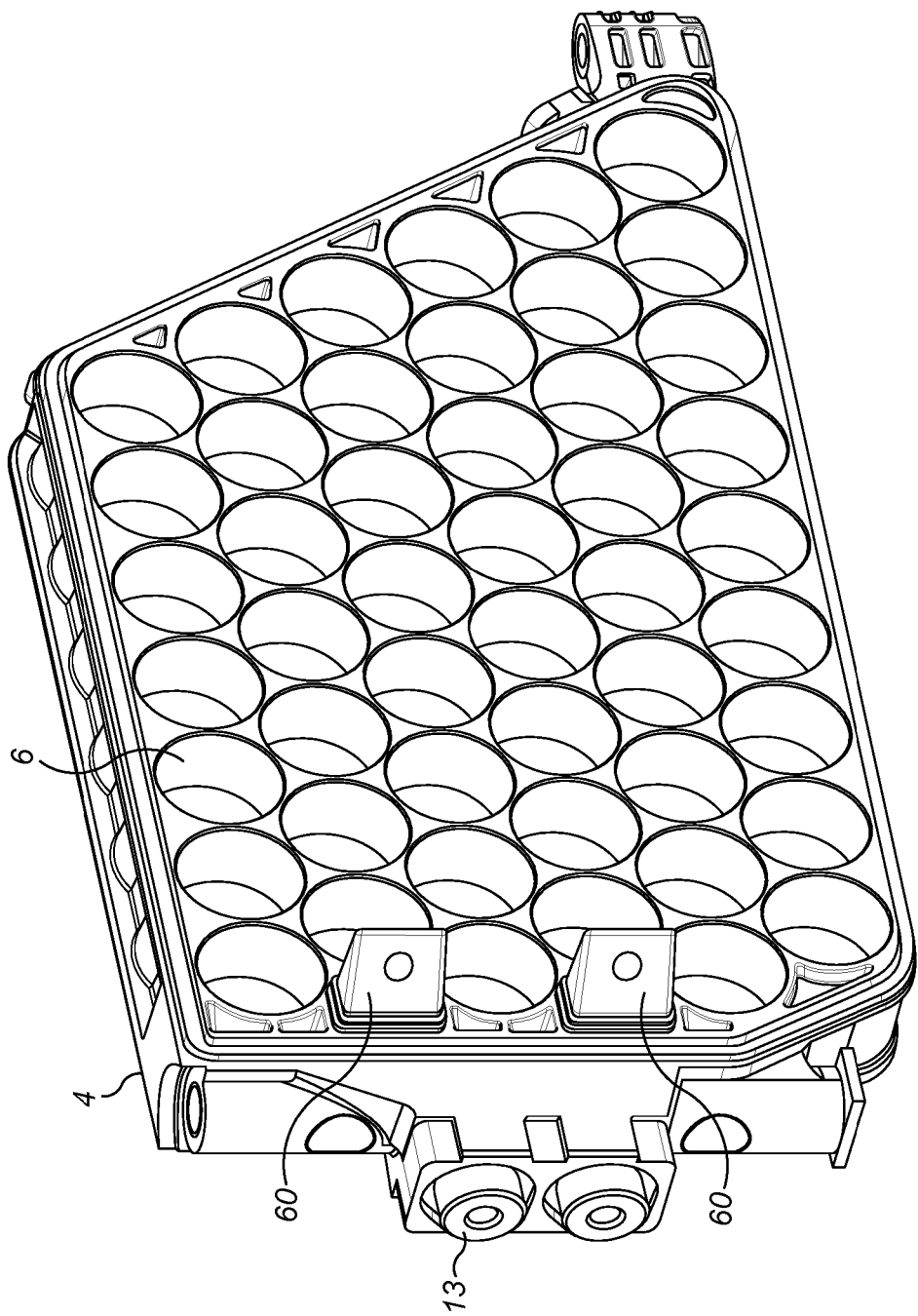
FIG. 10 shows an alternative form of flow deflecting surfaces.

In FIG. 8, the supply conduit 14 is connected to an inlet pathway 70 which extends substantially perpendicularly to the supply conduit. A pair of coolant inlets 71, 72 each extend substantially perpendicularly to the inlet pathway and permit coolant to pass into the battery module. As will be understood from FIG. 7, the terminal tabs 60, 61 extend from the busbar on the outermost part of the cells towards the module terminals 13 located in the middle of the battery module, that is substantially level with the mid point of the cells. The terminal tabs 60, 61 therefore pass across the coolant inlets 71, 72 and typically at least a portion of the terminal tabs overlaps at least one of the coolant inlets. By this, we mean that the inlet flow through the relevant coolant inlet will directly impact or impinge upon the terminal tab. The coolant inlets are typically in the form of a cylindrical channel and the position of the terminal tab relative to the coolant inlet is preferably one in which, if the channel forming the coolant inlet were extended towards the terminal tab, the channel would make contact with the terminal tab. Thus, inlet coolant flow is caused to be diverted by the terminal tab. This can be used to assist in directing at least some of the coolant flow towards regions of the battery module which would otherwise have lower flow, or which are known to be hotter and therefore require additional cooling. For example, the most distal region of the module, in this case lower corner 62, typically receives a lower flow rate of coolant, as it is the furthest from the inlets. By angling one or more of the terminals tabs downwardly, that is the upper portion of the tab being closer to the coolant inlet than the lower portion, additional flow can be directed to the lower corner 62. As well as diverting the flow up or down, the terminal tabs could be shaped to direct some coolant flow either towards or away from the cell tray 4, i.e. away from the cell tray means in a direction away from a longitudinal axis of the battery module and/or cell tray as shown for example in FIG. 10. In FIG. 10, the tab 60 is angled away from the cell tray 4, such that some of the coolant flow is directed towards an outer portion of the battery module, i.e. towards the ends of the battery cells.

The terminal tabs may be provided with a simple angled portion or may have the entire tab angled to divert flow. The angle of any angle portion may between 5 and 30 degrees off the vertical, more preferably 15-25 degrees. The angle of any angled portion may alternatively be measured with reference to the inlet flow direction, in which case the angle may be between 60 and 85 degrees to the inlet flow direction, more preferably 65 to 75 degrees. These angle ranges are more suited to a downward angle of the angled portion. Alternatively, if the angled portion is directing flow away from the longitudinal axis, the angled portion may be angled relative to the flow axis (i.e. away from the flow axis) by between 30 and 60 degrees, more preferably 40 to 50 degrees. It may be possible for the tab to be angled both downwardly and away from the longitudinal axis. Alternatively or additionally, the tab may be provided with one or more fins, projections or flaps which divert inlet coolant flow as it enters the battery module. The terminal tabs may have planar sections and/or curved sections.

In FIG. 9, the drain conduit 14 is connected to an outlet pathway 73 which extends substantially perpendicularly to the drain conduit. A pair of coolant outlets 74, 75 each extend substantially perpendicularly to the outlet pathway and permit coolant to pass out of the battery module.

Along with the use of the terminal tabs to divert incoming coolant flow, additional baffle plates 90 may also be placed within the chamber in which the coolant flows. These baffles plates may be placed on the inlet and/or outlet side of the module. The baffle plates may by planar or may be curved, and may even have two or more curves, to assist in directing coolant flow. Baffle plates may be located to divert flow towards certain regions for an extra cooling effect or may be used in regions of very low flow to prevent, or at least minimise, dead spots, that is regions in which flow becomes trapped. These might be areas between the inlets or outlets (as can be seen in FIG. 9) or in corners of the chamber. One of more baffle plates may include openings (not shown) through which coolant may pass. These opening would be to allow coolant flow to be directed to specific locations e.g. between adjacent cells, with the solid parts of the baffle plates preventing flow in a certain direction, e.g. to stop flow being directed straight at a cell.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of cooling an array of battery cells within a chamber in a housing, the battery cells being electrically connected via a busbar having at least one terminal tab for connection to an electrical terminal in the housing, the method comprising the steps of:
   supplying coolant through an opening in the housing into the chamber; and
   diverting at least a part of the coolant flow from an inlet flow path due to impingement of the flow upon a body portion of the at least one terminal tab, the body portion being angled relative to an inlet flow axis of the coolant flow.

2. The method according to claim 1, wherein the angle of the body portion of the at least one terminal tab relative to the flow axis is between 30 and 60 degrees, more preferably 40 to 50 degrees.

3. The method according to claim 1, wherein the angle of a body portion of the at least one terminal tab relative to the flow axis is between 60 and 85 degrees.

4. The method according to claim 1, wherein the inlet flow is diverted towards a distal corner.

5. The method according to claim 4, wherein the distal corner is the corner furthest from the opening.

6. The method according to claim 4, wherein the distal corner is a lower corner.

7. The method according to claim 1, further comprising the step of diverting coolant from a first side of a cell tray to a second side of a cell tray.

8. The method according to claim 7, wherein the coolant flow passes through one or more openings in a distal end of the cell tray.

9. The method according to claim 1, wherein the busbar has a plurality of terminal tabs.

10. A battery comprising:
    a housing defining a chamber in which an array of battery cells are provided, the housing having an electrical terminal;
    an opening through the housing into the chamber through which, in use, coolant is supplied; and
    a busbar electrically connecting the array of battery cells and having a terminal tab for connection to the electrical terminal, the terminal tab having a body portion angled relative to an inlet flow axis of the coolant,
    wherein the terminal tab is positioned such that, in use, at least a part of the coolant flow impinges upon part of the terminal tab.

11. The battery according to claim 10, wherein the terminal tab is positioned in line with the inlet flow axis.

12. The battery according to claim 10, wherein the body portion is angled downwardly.

13. The battery according to claim 10, wherein the angle of the body portion of the terminal tab relative to the inlet flow axis of the coolant is between 60 and 85 degrees.

14. The battery according to claim 10, wherein the body portion is angled so as to direct flow away from a longitudinal axis of the housing.

15. The battery according to claim 14, wherein the angle of the body portion of the terminal tab relative to the inlet flow axis of the coolant is between 30 and 60 degrees, more preferably 40 to 50 degrees.

16. The battery according to claim 10, wherein the chamber has at least one distal corner.

17. The battery according to claim 10, wherein the terminal tab is angled towards a lower corner.

18. The battery according to claim 10, wherein the terminal tab is angled towards the corner furthest from the opening.

19. The battery according to claim 10, further comprising one or more openings to permit coolant flow to pass from one side of a cell tray for supporting the battery cells to the other.

20. The battery according to claim 19, wherein the one or more openings are larger towards the most distal part of the housing.

* * * * *